United States Patent [19]

Kurozu et al.

[11] Patent Number: 4,934,769
[45] Date of Patent: Jun. 19, 1990

[54] POWER SUPPLY CIRCUIT FOR AUTOMOTIVE HEADLAMP

[75] Inventors: Tomotaka Kurozu, Tokyo, Japan; Sachiro Kataoka, Ann Arbor, Mich.; Kazuhiro Sugai, Kanagawa, Japan

[73] Assignee: Nissan Motor Co., Ltd., Japan

[21] Appl. No.: 146,401

[22] Filed: Jan. 21, 1988

[30] Foreign Application Priority Data

Jan. 22, 1987 [JP] Japan ................... 62-13125

[51] Int. Cl.$^5$ .................... B60Q 1/02; H05B 37/00; H05B 39/00
[52] U.S. Cl. ........................ 315/83; 315/191
[58] Field of Search ............. 315/83, 82, 77, 191

[56] References Cited

U.S. PATENT DOCUMENTS 3,360,681  9/1965  Kohler et al. ................ 315/77

FOREIGN PATENT DOCUMENTS 220962    5/1925  United Kingdom .
256460    8/1926  United Kingdom .
282246   12/1927  United Kingdom .
296757    8/1928  United Kingdom .
1134462   1/1966  United Kingdom .
1489401  10/1977  United Kingdom .

Primary Examiner—Eugene R. LaRoche
Assistant Examiner—Ali Neyzari
Attorney, Agent, or Firm—Leydig, Voit & Mayer

[57] ABSTRACT

A power supply circuit for automotive headlamps includes an electrical wire establishing communication between one of the headlamps and a power source at a first position of a combination switch, and a control unit selectively establishing communication between the other headlamp and the power source at the first position and between both of the headlamps and the power source in series at a second position of the combination switch.

14 Claims, 1 Drawing Sheet

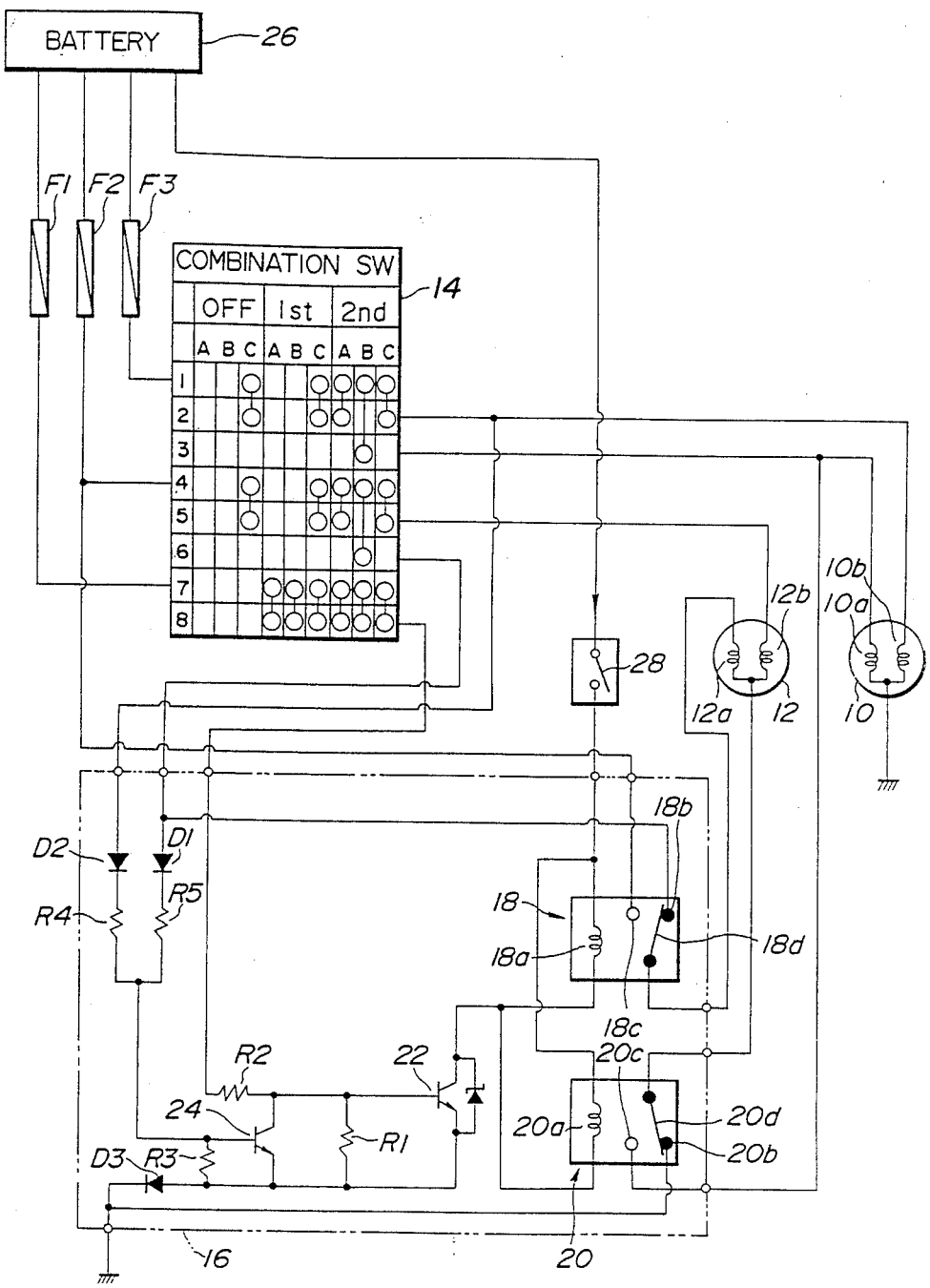

POWER SUPPLY CIRCUIT FOR AUTOMOTIVE HEADLAMP

BACKGROUND OF THE INVENTION

1. Field of the Invention

The present invention relates generally to a power supply circuit for headlamps mounted on automotive vehicles. More specifically, the invention relates to a power supply circuit in which a pair of headlamps can be selectively connected to a power source in series or parallel so as to decrease or increase luminous intensity thereof.

2. Description of the Prior Art

Such a power supply circuit is described in the Japanese Utility Model First Publication (Jikkai) Showa No. 59-118648. This circuit comprises a pair of headlamps, a battery, a manually operable switch and a relay which can selectively establish the communication between the battery and the headlamps in series or parallel. In this circuit, the headlamps are connected to the battery in parallel via the relay when the switch is OFF so that luminous intensities of the headlamps are relatively high. In response to turning ON of the switch, the headlamps are connected to the battery in series via the realy, so that the intensities can be decreased. In this case, the headlamps can not be turned on if the connection in the relay is bad.

SUMMARY OF THE INVENTION

It is therefore a principal object of the present invention to provide a power supply circuit for automotive headlamps which can supply electrical power to at least one of the headlamps if the electrical connection in a control unit, which selectively allows the headlamps to be connected to a power source in series or parallel, is bad.

In order to accomplish the aforementioned and other specific objects, the power supply circuit includes an electrical wire establishing the communication between one of the headlamps and a power source at a first position of a combination switch, and a control unit selectively establishing the communication between the other headlamp and the power source at the first position and between both of the headlamps and the power source in series at a second position of the combination switch.

According to one aspect of the present invention, the power supply circuit for an automotive headlamp system including first and second headlamps comprises:

a power source for supplying electrical power;

a switch assembly selectively operable between a plurality of switch positions including a first position at which a first magnitude of electric current is supplied to the first and second headlamps for dimmer lighting, and a second position at which a second magnitude of electric current greater than the first magnitude is supplied to the first and second headlamps for emitting light beams for illuminating the front side of the vehicle;

a current control circuit, interposed between the power source and the first and second headlamps, for adjusting current to be supplied to the first and second headlamps;

a first circuit establishing a series circuit including the power source and the first and second headlamps for supplying the first magnitude of electric current via the current control circuit, when the switch assembly is at the first position; and a second circuit connecting each of the first and second headlamps to the power source in parallel to each other when the switch assembly is at the second position, the second circuit connecting the second headlamp to the power source via the current control circuit and the first headlamp to the power source via a bypass circuit bypassing the control circuit when the switch assembly is at the second position.

The current control circuit may include a relay which establishes the communication between the first and second headlamps and the power source in series in response to turning ON of a relay. The current control circuit may also include the transistor which turns the relay off in response to turning ON of the transistor.

According to another aspect of the invention, the power supply circuit for an automotive headlamp system including first and second headlamps, each of which includes a low-beam filament for low beam lighting and a high-beam filament for high beam lighting, comprises:

a power source for supplying electrical power;

a switch assembly selectively operable between a plurality of switch positions including a first position at which a first magnitude of electric current is supplied to the low-beam filaments of the first and second headlamps for dimmer lighting, and a second position at which a second magnitude of electric current greater than the first magnitude is supplied to the first and second headlamps for emitting light beam for illuminating the front side of the vehicle, the switch assembly, at the second position, being further operable between a high beam position at which the second magnitude of electric current is supplied to the high-beam filaments of the first and second headlamps and a low beam position at which the second magnitude of electric current is supplied to the low-beam filaments of the first and second headlamps;

a current control circuit, interposed between the power source and the first and second headlamps, for adjusting current to be supplied to the first and second headlamps;

a first circuit establishing a series circuit including the power source and the low-beam filaments of the first and second headlamps for supplying first magnitude of electric current via the current control circuit, when the switch assembly is at the first position; and a second circuit connecting the low-beam filaments of the first and second headlamps to the power source in parallel to each other when the switch assembly is at the low beam position, and the high-beam filaments of the first and second headlamps to the power source in parallel to each other when the switch assembly is at the high beam position, the second circuit connecting the and second headlamp to the power source via the current control circuit and the first headlamp to the power source via a bypass circuit bypassing the control circuit, when the switch assembly is at the second position.

According to another aspect of the invention, the power supply circuit for an automotive headlamp system including first and second headlamps comprises:

a power source for supplying electrical power;

a switch assembly selectively operable between a first position at which a first magnitude of electric current is supplied to the first and second headlamps for dimmer lighting, and a second position at which a second magnitude of electric current greater than the first magnitude is supplied to the first and second headlamps for emitting light beams for illuminating the front side of the vehicle;

first means, cooperative with the switch assembly, for connecting the first headlamp to the power source at the second position; and second means, cooperative with the switch assembly, for connecting the second headlamp to the power source at the second position and for establishing a series circuit including the power source and the first and second headlamps at the first position.

The second means may include a relay which establishes the communication between the first and second headlamps and the power source in series in response to turning ON of a relay. The second means may also include a transistor which turns the relay off in response to turning ON of the transistor. The first means may comprise an electrical wire connecting said first headlamp to said power source via said switch assembly.

According to another aspect of the invention, the power supply circuit for an automotive headlamp system including first and second headlamps, each of which includes a low-beam filament for low beam lighting and a high-beam filament for high beam lighting, comprises:

a power source for supplying electrical power;

a switch assembly selectively operable between a plurality of switch positions including a first position at which a first magnitude of electric current is supplied to the low-beam filaments of the first and second headlamps for dimmer lighting, and a second position at which a second magnitude of electric current greater than the first magnitude is supplied to the first and second headlamps for emitting light beam for illuminating the front side of the vehicle, the switch assembly, at the second position, being further operable between a high beam position at which the second magnitude of electric current is supplied to the high-beam filaments of the first and second headlamps and a low beam position at which the second magnitude of electric current is supplied to the low-beam filaments of the first and second headlamps;

first means, cooperative with the switch assembly, for connecting the low-beam filament of the first headlamp to the power source at the low beam position and the high-beam filament of the first headlamp to the power source at the high beam position when the switch assembly is switched to the second position; and second means, cooperative with the switch assembly, for connecting the low-beam filament of the second headlamp to the power source at the low beam position and the high-beam filament of the second headlamp to the power source at the high beam position when the switch assembly is switched to the second position, and for establishing a series circuit including the low-beam filaments of the first and second headlamps and the power source at the first position.

BRIEF DESCRIPTION OF THE DRAWING

The accompanied drawing is a circuit diagram of the preferred embodiment of a power supply circuit according to the present invention.

DESCRIPTION OF THE PREFERRED EMBODIMENT

Referring now to the drawing, a power supply circuit includes right and left headlamps 10 and 12, each of which comprises a low-beam filament 10a or 12a and a high-beam filament 10b or 12b.

The power supply circuit also includes a combination switch 14 which has eight terminals 1 to 8. The combination switch 14 has three positions: an OFF position at which the low-beam filaments 10a and 12a are turned off, a first position at which the low-beam filaments 10a and 12a are connected to each other in series to emit dimmer light, and a second position at which the low-beam filaments 10a and 12a or the high-beam filaments 10b and 12b are connected to each other in parallel to emit brighter light. At each of these positions, the combination switch 14 has three positions: a high beam position, a low beam position and a flashing position at which the high-beam filaments 10b and 12b are temporally connected to each other in parallel to emit brighter light in order to give the occupant in a forward vehicle warning. The high beam, low beam and flashing positions will be hereafter referred as to "position A", "position B" and "position C", respectively. At the OFF position, the terminals 1 and 4 are electrically connected to the terminals 2 and 5 respectively, when the combination switch 14 is switched to the position C. At the first position, the terminal 7 is electrically connected to the terminal 8 when the combination switch 14 is switched to any of positions A, B or C. In addition, when the combination switch 14 is switched to the position C, the terminals 1 and 4 are electrically connected to the terminals 2 and 5 respectively. At the second position, the terminals 1, 4 and 7 are electrically connected to the terminals 2, 5 and 8 respectively when the combination switch 14 is switched to the position A or C. When the combination switch 14 is switched to the position B, the terminals 1, 4 and 7 are electrically connected to the terminals 3, 6 and 8 respectively.

The terminals 1, 4 and 7 of the combination switch 14 are connected to a battery 26 serving as power source via fuses $F_3$, $F_2$ and $F_1$ respectively.

The power supply circuit further includes a control unit 16 which comprises relays 18 and 20, switching transistors 22 and 24 and diodes $D_1$, $D_2$ and $D_3$. The relay 18 comprises a relay coil 18a, stationary terminals 18b and 18c and a movable contact 18d which is movable between the stationary terminals 18b and 18c due to the exciting force of the relay coil 18a. The movable contact 18d is electrically connected to the terminal 18b when the electricity does not run through the relay coil 18a, and is connected to the terminal 18c when the electricity runs through the relay coil 18a. The relay 20 comprises a relay coil 20a, stationary terminals 20b and 20c and a movable contact 20d which is movable in the same manner as that of the relay 18.

One end of the relay coils 18a and 20a respectively are connected to the battery 26 via a switch 28 which is turned on in response to turning ON an ignition switch (not shown), and the other end thereof respectively are connected to the collector electrode of the transistor 22, the emitter electrode of which is connected to ground via the diode $D_3$, so that the electricity runs through the relay coils 18a and 20a in response to turning ON of the transistor 22 when the switch 28 is turned on. The base electrode of the transistor 22 is connected to ground via a resistor $R_1$ and the diode $D_3$ so as to be electrically connected to ground in response to turning ON of the transistor 24. The base electrode of the transistor 22 is also connected to the terminal 8 of the combination switch 14 via a resistor $R_2$ in order to apply voltage thereto when the communication between the terminals 7 and 8 is established. The collector electrode of the transistor 24 is electrically connected to the terminal 8 via the resistor $R_2$, and the emitter thereof is connected to ground via diode $D_3$ so that the transistor 22 is turned off in response to turning ON of the transistor 24. The base electrode of the transistor 24 is connected to ground via a resistor $R_3$ and the diode $D_3$. In addition, the base electrode thereof is connected to the terminal 2 of the combination switch 14 via the diode $D_2$ and a resistor $R_4$, and is connected to the terminal 6 thereof via the diode $D_1$ and a resistor $R_5$. Therefore, the transistor 24 is turned on when the communication between the terminals 1 and 2 or the terminals 4 and 6 is established.

First ends of the high-beam filament 10b and the low-beam filament 10a of the headlamp 10 are electrically connected to the terminals 2 and 3 of the combination switch 14 respectively, and the other ends thereof are connected to ground in parallel, so that the high-beam and low-beam filaments 10b and 10a are turned on when the communication between the terminals 1 and 2 and between the terminals 1 and 3 is established respectively.

One end of the high-beam filament 12b of the headlamp 12 is connected to the terminal 5 of the combination switch 14. One end of the low-beam filament 12a of the headlamp 12 is connected to the movable contact 18d of the relay 18, the stationary terminal 18b of which is connected to the terminal 6 of the combination switch 14. The other ends of the low-beam and high-beam filaments 12a and 12b of the headlamp 12 are connected, in parallel, to the movable contact 20d of the relay 20, the stationary terminal 20b of which is connected to ground. Therefore, the low-beam and high-beam filaments 12a and 12b of the headlamps 12 can be turned on in response to turning OFF of the relays 18 and 20 when communication is established between the terminals 4 and 6 and between terminals 4 and 5 respectively. The stationary terminal 18c of the relay 18 is connected to the battery 26 via the fuse $F_2$, and the stationary terminal 20c of the relay 20 is connected to the one end of the low-beam filament 10a of the headlamp 10, so that the low-beam filaments 10a and 12a are electrically connected to the battery 26 in series so as to emit dimmer light.

With this construction, when the ignition switch is ON, i.e. when the switch 28 is ON, the operation of the power supply circuit according to the present invention is described below.

(1) OFF Position

When the combination switch 14 is switched to either the position A or B (high beam mode or low beam mode) at the OFF position, the headlamps 10 and 12 are not turned on.

When the combination switch 14 is switched to the position C (flashing mode), the base electrode of the transistor 22 is not electrically connected to the battery since the communication between the terminals 7 and 8 of the combination switch 14 is blocked. Therefore, the transistor 22 remains OFF, so that the relays 18 and 20 remain OFF, thereby the movable contacts 18d and 20d are connected to the stationary terminals 18b and 20b respectively. As a result, the electricity runs into ground via the fuse $F_2$, the terminals 4 and 5 of the combination switch 14, the high-beam filament 12b of the headlamp 12, and the movable contact 20d and the stationary terminal 20b of the relay 20. That is, the high-beam filament 12b is electrically connected to the battery 26 to be turned on. On the other hand, the high-beam filament 10b of the headlamp 10 is electrically connected to the battery 26 via the fuse $F_3$ and the terminals 1 and 2 of the combination switch 14, so that the high-beam filament 10b is also turned on. In this case, the luminous intensities thereof are relatively high since the high-beam filaments 10b and 12b are connected to the battery 26 in parallel. Accordingly, the flashing operation, by which the headlamps 10 and 12 are manually switched to the high beam mode for a short time, can be achieved.

(2) First Position (Series)

When the combination switch 14 is switched to the position B (low beam mode) at the first position, the base electrode of the transistor 22 is electrically connected to the battery 26 via the terminals 7 and 8 of the combination switch 14, so that the transistor 22 is turned on, thereby the relays 18 and 20 are turned on. When the relays 18 and 20 are ON, the movable contacts 18d and 20d are electrically connected to the stationary terminals 18c and 20c respectively. As a result, the electricity runs into ground via the fuse $F_2$, the stationary terminal 18c and the movable contact 18d of the relay 18, the low-beam filament 12a of the headlamp 12, the movable contact 20d and the stationary terminal 20c of the relay 20, and the low-beam filament 10a of the headlamp 10, so that the low-beam filaments 10a and 12a are turned on. In this case, since the low-beam filaments 10a and 12a are connected to each other in series, the luminous intensities thereof are relatively low, or the emitted light is dimmer than that in parallel.

When the combination switch is switched to the position C (flashing mode), the base electrode of the transistor 24 is electrically connected to the battery 26 via the terminals 1 and 2 of the combination switch 14, the diode $D_2$ and the resistor $R_4$. Thus, the transistor 24 is turned on, and the transistor 22 becomes OFF since voltage applied to the base electrode of the transistor 22 is less than the turn-on voltage for the transistor 22. Current flowing from the battery 26 through the fuse $F_1$, the terminals 7 and 8, and the resistor $R_2$ is diverted through the transistor 24 and thus does not provide base drive to the transistor 22. Therefore, the relays 18 and 20 become OFF since the transistor 22 is OFF. When the relays 18 and 20 are OFF, the movable contacts 18d and 20d are electrically connected to the stationary terminals 18b and 20b respectively. As a result, the electricity runs through two circuits, one of which establishes the communication between the battery 26 and ground via the fuse $F_3$, the terminals 1 and 2 of the combination switch 14 and the high-beam filament 10b of the headlamp 10, and the other of which establishes the communication between the battery 26 and ground via the fuse $F_2$, the terminals 4 and 5 of the combination switch 14, the high-beam filament 12b of the headlamp 12, and the movable contact 20d and the stationary terminal 20b of the relay 20. Accordingly, the high-beam filaments 10b and 12b, respectively, of the headlamps 10 and 12 are electrically connected to the battery 26 in parallel to be turned on. In this case, the luminous intensities thereof are higher than that when the the headlamps 10 and 12 are connected to battery 26 in series. Therefore, the flashing operation can be achieved.

When the combination switch 14 is switched to the position A (high beam mode), the luminous intensities of the low-beam filaments 10a and 12a, respectively, of the headlamps 10 and 12 remain relatively low, similar to the position B. When the switch 28 is OFF, i.e. when the ignition switch is OFF, the headlamps 10 and 12 are not turned on since the relays 18 and 20 become OFF.

(3) Second Position (Parallel)

When the combination switch 14 is switched to the position B (low beam mode) at the second position, the base electrode of the transistor 24 is electrically connected to the battery 26 via the fuse $F_2$, the terminals 4 and 6 of the combination switch 14, the diode $D_1$ and the resistor $R_5$, so that the transistor 24 is turned on, and the transistor 22 becomes OFF since voltage applied to the base electrode of the transistor 22 is less than the turn-on voltage for the transistor 22. Current flowing from the battery 26 through the fuse $F_1$, the terminals 7 and 8, and the resistor R2 is diverted through the transistor 24 and thus does not provide base drive to the transistor 22. Therefore, the relays 18 and 20 become OFF so that the movable contacts 18d and 20d are electrically connected to the stationary terminals 18b and 20b respectively. As a result, the electricity runs through two circuits, one of which establishes communication between the battery 26 and ground via the fuse $F_3$, the terminals 1 and 3 of the combination switch 14 and the low-beam filament 10a of the headlamp 10. The other establishes communication between the battery 26 and ground via the fuse $F_2$, the terminals 4 and 6 of the combination switch 14, the stationary terminal 18b and the movable contact 18d of the relay 18, the low-beam filament 12a of the headlamp 12 and the movable contact 20d and the stationary terminal 20b of the relay 20. Accordingly, the low-beam filaments 10a and 12a are electrically connected to the battery 26 in parallel to emit brighter low-beam light.

When the combination switch 14 is switched to the position A (high beam mode), the base electrode of the transistor 24 is electrically connected to the battery 26 via the fuse $F_3$, the terminals 1 and 2 of the combination switch 14, the diode $D_2$ and the resistor $R_4$, so that the transistor 24 is turned on and transistor 22 becomes OFF since voltage applied to the base electrode of the transistor 22 is less than the turn-on voltage for the transistor 22. Current flowing from the battery 26 through the fuse $F_1$, the terminals 7 and 8, and the resistor R2 is diverted through the transistor 24 and thus does not provide base drive to the transistor 22. Therefore, the relays 18 and 20 remain OFF, so that the movable contacts 18d and 20d are electrically connected to the stationary terminals 18b and 20b respectively. As a result, two independent circuits are established, one of which comprises the battery 26, the fuse $F_3$, the terminals 1 and 2 of the combination switch, the high-beam filament 10b of the headlamp 10 and ground, and the other of which comprises the battery 26, the fuse $F_2$, the terminals 4 and 5 of the combination switch 14, the high-beam filament 12b of the headlamp 12, the movable contact 20d and the stationary terminal 20b of the relay 20 and ground. That is, the high-beam filaments 10b and 12b are electrically connected to ground in parallel to emit brighter high-beam light.

When the combination switch 14 is switched to the position C (flashing mode), the headlamps 10 and 12 are turned on similar to when it is switched to the position A (high-beam mode). In cases where the combination switch 14 is switched to the position A or C at the second position, the headlamps 10 and 12 can also be turned on when the ignition switch is OFF, i.e. when the switch 28 is OFF.

According to the present invention, the control unit 16 including the relays 18 and 20 is not connected between the battery 26 and the headlamp 10. Therefore, even if the connection between the combination switch 14 and/or between the terminals in the relays 18 and 20 become abnormal, at least the headlamp 10 can be turned on when the combination switch 14 is switched to the second position.

In this case, the headlamp 12 can also be turned on when the connections between the high-beam filament 12b of the headlamp 12, the movable contact 20d and the stationary terminal 20b of the relay 20, and ground is normal.

We claim:

1. A power supply circuit for an automotive headlamp system including first and second headlamps, which comprises:

a power source for supplying electrical power;

a switch assembly selectively operable between a plurality of switch positions including a first position at which a first magnitude of electric current is supplied to the first and second headlamps for dimmer lighting, and a second position at which a second magnitude of electric current greater than the first magnitude is supplied to the first and second headlamps for emitting light beams for illuminating a front side of the vehicle;

a current control circuit, interposed between said power source and the first and second headlamps, for adjusting current to be supplied to the first and second headlamps;

a bypass circuit connected to bypass said current control circuit;

a first circuit establishing a series circuit including said power source and the first and second headlamps for supplying the first magnitude of electric current via said current control circuit, when said switch assembly is at the first position; and a second circuit connecting each of the first and second headlamps to said power source in parallel to each other when said switch assembly is at the second position, said second circuit connecting the second head lamp to said power source via said current control circuit and the first headlamp to said power source via said bypass circuit when said switch assembly is at the second position.

2. A power supply circuit as set forth in claim 1 wherein said current control circuit includes a relay which establishes the communication between the first and second headlamps and said power source in series in response to turning ON of said relay.

3. A power supply circuit as set forth in claim 2 wherein said current control circuit further includes transistor which turns said relay off in response to turning ON of said transistor.

4. A power supply circuit for an automotive headlamp system including first and second headlamps, each of which includes a low-beam filament for low beam lighting and a high-beam filament for high beam lighting, said power supply circuit comprising:

a power source for supplying electrical power;

a switch assembly selectively operable between a plurality of switch positions including a first position at which a first magnitude of electric current is supplied to the low-beam filaments of the first and second headlamps for dimmer lighting, and a second position at which a second magnitude of electric current greater than the first magnitude is supplied to the first and second headlamps for emitting light beams for illuminating a front side of the vehicle, said switch assembly, at the second position, being further operable between a high beam position at which the second magnitude of electric current is supplied to the high-beam filaments of the first and second headlamps and a low beam position at which the second magnitude of electric current is supplied to the low-beam filaments of the first and second headlamps;

a current control circuit, interposed between said power source and the first and second headlamps, for adjusting current to be supplied to the first and second headlamps;

a bypass circuit connected to bypass said current control circuit;

a first circuit establishing a series circuit including said power source and the low-beam filaments of the first and second headlamps for supplying the first magnitude of electric current via said current control circuit when said switch assembly is at the first position; and a second circuit connecting the low-beam filaments of the first and second headlamps to said power source in parallel to each other when said switch assembly is at the low beam position, and connecting the high beam filaments of the first and other when said switch assembly is at the high beam position, said second circuit connecting the second headlamp to said power source via said current control circuit and the first headlamp to said power source via said bypass circuit when said switch assembly is at the second position.

5. A power supply circuit as set forth in claim 4 wherein said current control circuit includes a relay which establishes communication between the first and second headlamps and said power source in series in response to turning ON of said relay.

6. A power supply circuit as set forth in claim 5 wherein said current control circuit further includes transistor which turns said relay off in response to turning ON of said transistor.

7. A power supply circuit for an automotive headlamp system including first and second headlamps which comprises:

a power source for supplying electrical power;

a control unit connected to receive the electrical power;

a switch assembly selectively operable between a first position in which the control unit is configured to supply a first magnitude of electric current to the first and second headlamps for dimmer lighting and a second position in which the control unit is configured to supply a second magnitude of electric current greater than the first magnitude to the first and second headlamps for emitting light beams for illuminating a front side of the vehicle;

the control unit including first means, cooperative with said switch assembly, for connecting the first headlamp to said power source at the second position, and second means, cooperative with said switch assembly, for connecting the second headlamp to said power source at the second position and for establishing a series circuit including said power source and the first and second headlamps at the first position; and a bypass circuit, cooperative with said switch assembly, connected to bypass said control unit and to supply current to the first headlamp at the second position.

8. A power supply circuit as set forth in claim 7 wherein said second means includes a relay which establishes the communication between the first and second headlamps and said power source in series in response to turning ON of said relay.

9. A power supply circuit as set forth in claim 8 wherein said second means further includes a transistor which turns said relay off in response to turning ON of said transistor.

10. A power supply circuit as set forth in claim 9 wherein said first means comprises an electrical wire connecting the first headlamp to said power source via said the switch assembly.

11. A power supply circuit for an automotive headlamp system including first and second headlamps, each of which includes a low-beam filament for low beam lighting and a high-beam filament for high beam lighting, said power supply circuit comprising:

a power source for supplying electrical power;

a control unit connected to receive the electrical power;

a switch assembly selectively operable between a plurality of switch positions including a first position in which the control unit is configured to supply a first magnitude of electric current to the low-beam filaments of the first and second headlamps for dimmer lighting and a second position in which the control unit is configured to supply a second magnitude of electric current greater than the first magnitude to the first and second headlamps for emitting light beams for illuminating a front side of the vehicle, said switch assembly, at the second position, being further operable between a high beam position at which the second magnitude of electric current is supplied to the high-beam filaments of the first and second headlamps and a low beam position at which the second magnitude of electric current is supplied to the low-beam filaments of the first and second headlamps;

the control unit including first means, cooperative with said switch assembly, for connecting the low-beam filament of the first headlamp to said power source at the low beam position and the high-beam filament of the first headlamp to said power source at the high beam position when said switch assembly is switched to the second position, and second means, cooperative with said switch assembly, for connecting the low-beam filament of the second head-lamp to said power source at the low beam position and the high-beam filament of the second headlamp to said power source at the high beam position when said switch assembly is switched to the second position, and for establishing a series circuit including the low-beam filaments of the first and second headlamps and said power source at the first position; and a bypass circuit, cooperative with said switch assembly, connected to bypass said control unit and to supply current to the low-beam filament of the first headlamp at the low beam position of the second position and to supply current to the high-beam filament of the first headlamp at the high beam position of the second position.

12. A power supply circuit as set forth in claim 11 wherein said second means includes a relay which establishes the communication between first and second headlamps and said power source in series in response to turning ON of said relay.

13. A power supply circuit as set forth in claim 12 wherein said second means further includes a transistor which turns said relay off in response to turning ON of the transistor.

14. A power supply circuit as set forth in claim 13 wherein said first means comprises an electrical wire connecting the low-beam and high-beam filaments of the first headlamp to said power source via said switch assembly.

* * * * *